United States Patent [19]

Krämer

[11] 4,023,671
[45] May 17, 1977

[54] CONNECTION FOR THE ENDS OF SUPPORTING STRAPS OF AN ENDLESS BAR BELT CONVEYOR

[75] Inventor: Hans Krämer, Hannover, Germany

[73] Assignee: Continental Gummi-Werke Aktiengesellschaft, Hannover, Germany

[22] Filed: Dec. 10, 1975

[21] Appl. No.: 639,390

[30] Foreign Application Priority Data

Dec. 10, 1974 Germany .......................... 2458364

[52] U.S. Cl. ................ 198/728; 198/699; 198/844; 74/231 J; 24/31 B
[51] Int. Cl.² ........................................ B65G 19/10
[58] Field of Search .......... 198/175, 193, 198, 199, 198/698, 699, 728, 731, 844, 846; 74/231 J, 237; 24/31 B, 31 W, 38

[56] References Cited

UNITED STATES PATENTS

| 880,356 | 2/1908 | Carter | 198/199 X |
|---|---|---|---|
| 2,743,829 | 1/1956 | Ballard | 198/193 X |
| 2,839,651 | 6/1958 | Erickson | 198/193 X |
| 2,930,478 | 3/1960 | Ruffino | 198/193 X |
| 3,076,226 | 2/1963 | Borton et al. | 198/198 X |
| 3,279,090 | 10/1966 | Harper | 24/38 X |
| 3,638,281 | 2/1972 | Francois | 24/31 B |
| 3,693,218 | 9/1972 | Jaubert et al. | 198/193 X |
| 3,725,976 | 4/1973 | MacKeown | 24/31 B X |
| 3,748,698 | 7/1973 | Lachmann | 24/38 |
| 3,776,293 | 12/1973 | Marzocchi | 198/193 X |

FOREIGN PATENTS OR APPLICATIONS

| 1,029,284 | 4/1958 | Germany | 198/193 |
|---|---|---|---|
| 2,009,810 | 9/1971 | Germany | 198/193 |
| 2,226,803 | 12/1972 | Germany | 198/193 |
| 753,291 | 7/1956 | United Kingdom | 74/231 J |
| 953,208 | 3/1964 | United Kingdom | 198/193 |

Primary Examiner—Evon C. Blunk
Assistant Examiner—Richard K. Thomson
Attorney, Agent, or Firm—Walter Becker

[57] ABSTRACT

A connection for the ends of the supporting straps of an endless bar belt conveyor, especially for agricultural machines, the bars of which are connected to the supporting straps by connecting members such as rivets and screws. Within the region of the two ends of each supporting strap there is provided a connecting member which engages the inner side of the respective adjacent supporting strap and is connected to the supporting strap by means of connecting elements such as rivets or preferably screws. The connecting member comprises a pull-resistant flexible layer which extends in the longitudinal direction of the supporting strap and has a thickness less than the thickness of the supporting straps.

6 Claims, 7 Drawing Figures

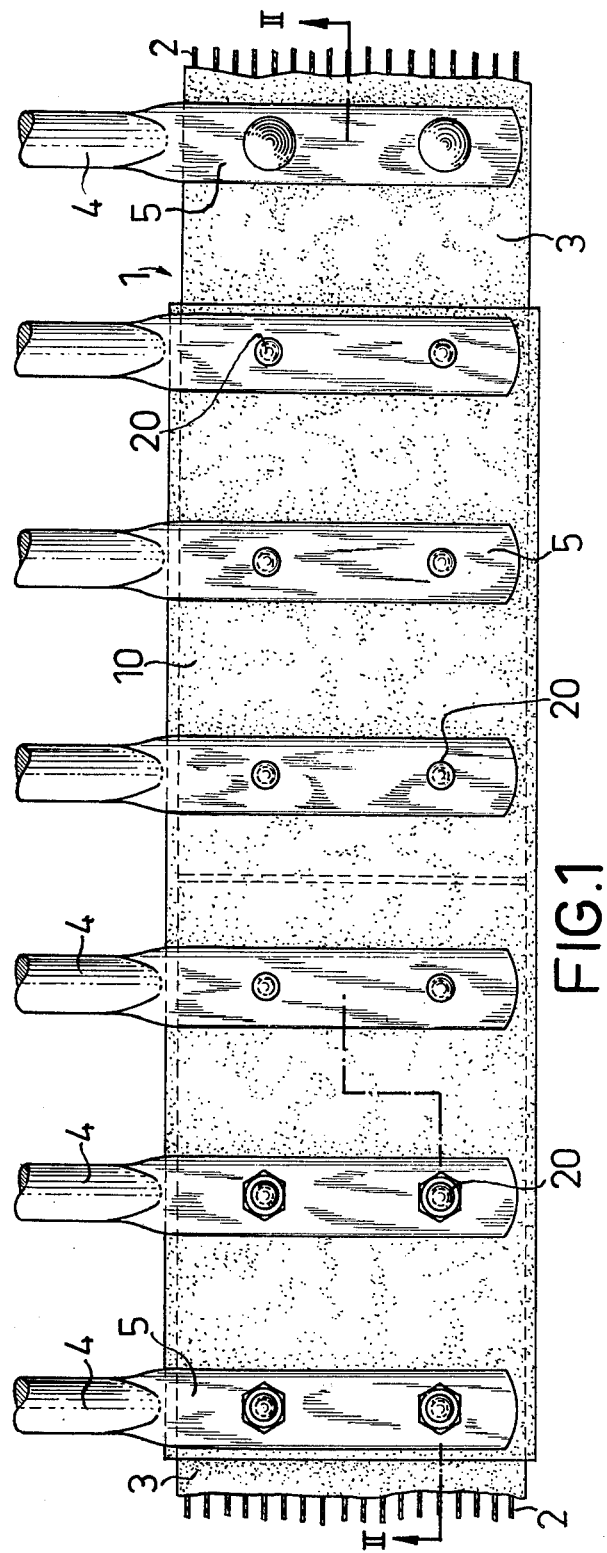
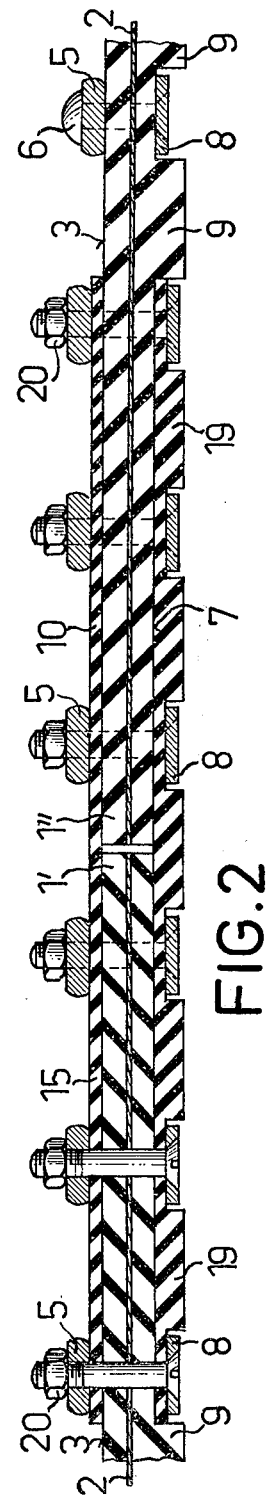

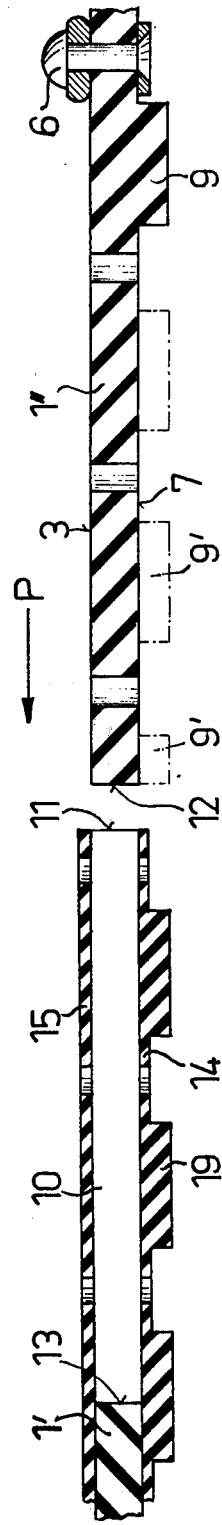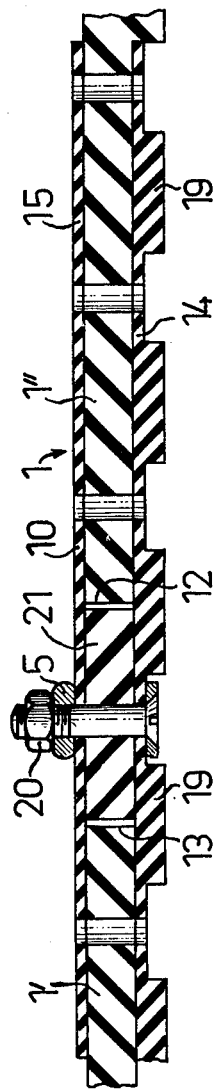

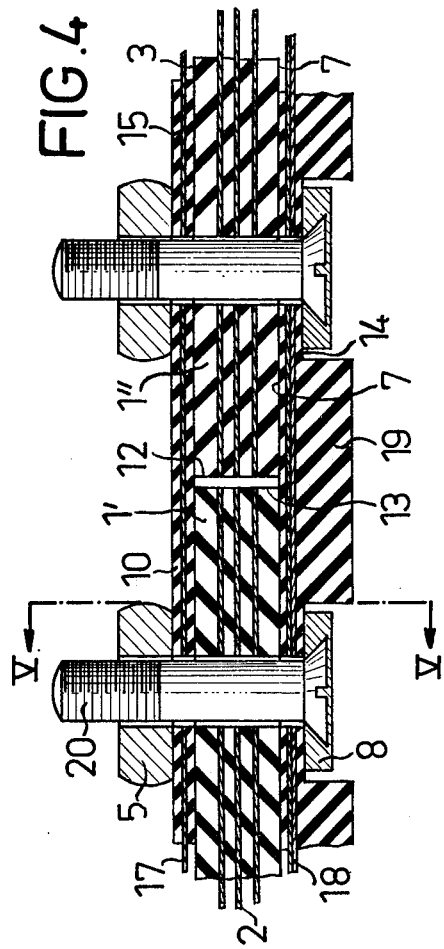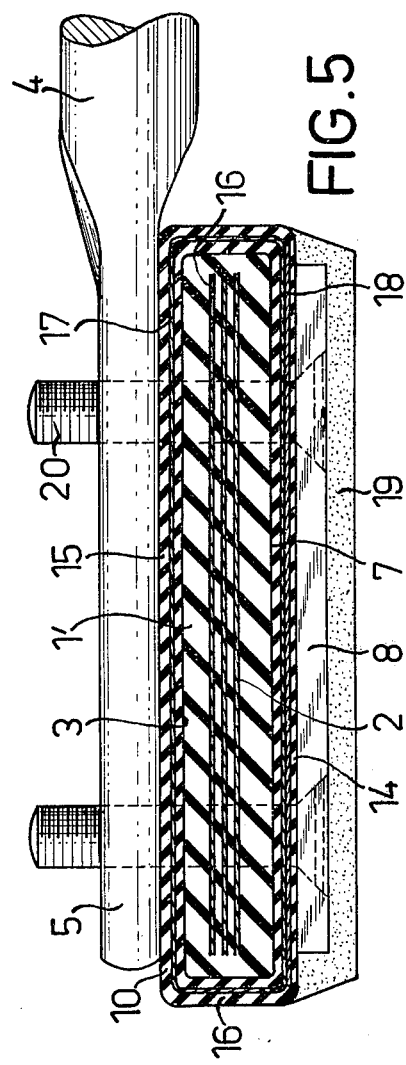

CONNECTION FOR THE ENDS OF SUPPORTING STRAPS OF AN ENDLESS BAR BELT CONVEYOR

The present invention relates to a connection for the ends of supporting belts of an endless bar or rod belt conveyor, especially for agricultural machinery. With a heretofore known and proven design of such bar or rod conveyors, the bars are connected by rivets or screws to the supporting belts. The supporting belts comprise a plurality of very strong fabric or textile threads which are covered by one more or less thick rubber layer or layers respectively.

It is frequently customary to produce the supporting belts by vulcanization as endless belts. This, however, makes the installation in the machine more difficult, especially when repairs become necessary, because in such an instance the removal and installation of the belt is practically possible only by removing the driving and reversing rollers of the conveyor. Therefore, endeavors have been made to provide a connection for the ends of a supporting belt which can easily be produced and which can be installed and removed without the removal of parts of the machine.

Thus, in case of a break of the supporting belt it has been suggested to bridge the broken area by a piece of a similar supporting belt which is riveted to the broken belt from the outside, or the ends of the supporting belt are in mutually overlapping condition riveted directly to each other or are connected to each other by means of screw bolts. However, the thus obtained thickening of the supporting belt at the connecting area results in an unavoidable unsteady running of the driving and reverssing rollers whereby shock-like stresses are produced which enhance the danger of breakage.

It has also become known to provide the ends of the supporting belt with hinge sections and to pivotally connect the same by passing a pin therethrough. Aside from the fact that, for instance with potato harvesting machines, it is unavoidable that sand will enter the hinges and thereby will bring about a fast wear thereof, there exists the drawback that the hinge sections which consist of metal have to be very short in order not to affect the flexibility of the supporting belt. Nevertheless, with such a construction, the ends of the supporting belt are at the ends facing away from the hinges relatively sharply bent when the belt passes over the reversing rollers so that the hinges will prematurely break.

Another heretofore known way of interconnecting the ends of the supporting belts consists in that the ends are stepwise tapered in conformity with the number of fabric inserts and are, connected in this manner, placed upon each other and riveted or screwed to each other. This way of joining can, however, be carried out only by skilled persons. It is practically impossible to carry out this kind of repair work in the fields. A rather serious drawback also consists in that during each repair the supporting belt has to be shortened by the length of the joint. Thus, in most instances, the repaired belt can no longer be used for the machinery in which it was previously used.

It is, therefore, an object of the present invention to provide a connection for the ends of the supporting belts of an endless bar or rod belt conveyor which connection will avoid the above mentioned drawbacks and will be suitable for the original equipment as well as for repairs and which connection can be carried out also by unskilled persons.

It is another object of the invention to provide a connection as set forth above which will assure a shock-free running of the bar belt conveyor and, in case of necessary repairs, will make it possible to maintain the length of the supporting belts without being subjected to increased wear.

These and other objects and advantages of the invention will appear more clearly from the following specification in connection with the accompanying drawings, in which:

FIG. 1 is a top view of the outside of a supporting belt or strap and its connecting member.

FIG. 2 represents a longitudinal section through FIG. 1.

FIG. 3 shows a longitudinal section through the connecting member.

FIG. 3a represents a side view of that end of the conveyor belt which is to be inserted into the connecting member.

FIG. 4 represents on a somewhat larger scale than that of FIGS. 1 to 3 a section of FIG. 2 which is located in the vicinity of the end faces of the supporting strap.

FIG. 5 shows a cross section through the supporting strap and the connecting member, said section being taken along the line V — V of FIG. 4.

FIG. 6 is a fragmentary longitudinal section similar to that of FIG. 2 but with inserted filling member.

The connection for the ends of supporting straps of an endless rod belt conveyor according to the invention is characterized in that a connecting member is provided which within the region of the two ends of each supporting strap engages the inner side of the strap and is to be connected by rivets or screws to the supporting strap while the connecting member comprises a pull-resistant flexible layer which extends in the longitudinal direction of the supporting strap and has a thickness which is less than the thickness of the supporting strap. This layer expediently consists of one or more layers of fabric or of threads of polyamide or polyester resin with a rubber layer thereon, the threads being oriented in the direction of the supporting strap. In this way it can be realized that the pull-resistance of the layer reaches the pull-resistance of the reinforcement of the supporting strap itself and does so even if it has only a fraction of the thickness of the supporting strap.

For connecting the layer serving as connecting means to the supporting strap, the rivets or screws provided for the connection of the rods or bars may be used. In particular, screw connections are to be preferred when a repair is involved.

The length of the connecting means should be so selected that it extends over the region of the connecting areas of at least two, preferably three, bars of each of the two ends of the supporting strap.

In view of the slight thickness, the flexibility of the layer is already considerable. Inasmuch as the layer due to its slight thickness can be placed rather close to the reinforcement of the supporting strap, the flexibility of the supporting strap within the region of the layer is in spite of its relatively great length hardly affected so that a shock-free running over the reversing rollers will be possible.

According to a further development of the invention, the connecting link comprises in addition to the layer provided on the inner side of the supporting strap a pull-resistant flexible layer which engages the outside of the supporting strap within the region of is two ends. In order thereby not to greatly affect the flexibility of the connecting area, the elasticity in the longitudinal direction of the last mentioned layer should be greater than that of the layer provided on the inner side of the supporting strap.

Furthermore, the layers of the connecting member which are provided on the inside and on the outside of the supporting strap can be connected to each other by the partial sections which surround the lateral surfaces of the supporting strap while forming a flat closed hollow profile of rectangular cross section. In this way the butt area between the end faces of the two ends of the supporting strap is sealed against the entry of dust and dirt.

Particularly favorable is the application of the connection according to the invention with such supporting straps the inner side of which is provided with block-shaped protrusions. These protrusions which consist of one piece with the rubberized material of the supporting strap are cut off and are replaced by corresponding protrusions provided on the connecting member. The counter plates provided on the inner side of the supporting strap and intended for the rivets or screw bolts for connecting the bars thus remain also within the region of the connecting means out of engagement with the reversing rollers even though the clear height of the intermediate spaces between the protrusions is here less than at the remaining portions of the supporting strap. This is a further favorable result of the relatively slight thickness of the layer on the inner side of the supporting strap.

The two end faces of each supporting strap are expediently moved toward each other in this connection in such a way that the distance of the respective two bars adjacent the end faces equals the mutual distance between the remaining bars of the bar belt conveyor. In this way there is at the same time obtained a projection of the ends of the supporting strap beyond the connecting area which projection is sufficient for the durability of the connection of the bars on the supporting strap which bars are adjacent to the end faces.

Inasmuch as in case the straps of a bar belt conveyor break, in most instances the connecting sections for one or two bars will be missing on the still usable strap length, it may be necessary to provide new connecting areas. To this end, an intermediate space may be provided between the two end faces of the supporting strap which intermediate space corresponds approximately to the mutual distance between the bars of the bar belt conveyor or a multiple thereof depending on the number of the bars to be replaced. This intermediate space is to be filled in by one or more flexible filling pieces which can be connected by rivets or screws to the connecting member and together therewith an associated bar each.

Referring now to the drawings in detail and FIGS. 1, 2 and 5 thereof in particular, the connecting member 10 comprises a flat hollow profile of rectangular cross section. The connecting member 10 is provided with a layer 14 which engages the inner side 7 of the inserted ends 1' and 1" of the supporting strap 1. The layer 14 is provided with a longitudinal reinforcement 18 and has less thickness than the ends 1' and 1" of the supporting strap 1. The connecting member 10 futhermore comprises a layer 15 which engages the outside 3 of the inserted ends 1' and 1", the layer 15 being provided with a longitudinal reinforcement 17.

As will be seen from FIG. 5, the reinforcement 18 of the inner layer 14 has a double layer inasmuch as it is this layer which primarily is intended to absorb the pull-stresses of the supporting strap 1. within the region of the connecting area. The reinforcement 18 is located so close to the reinforcement 2 of the supporting strap 1 that within the region of the connecting member 10 practically no bending stiffness occurs which would affect the movement of the belt over the reversing rollers.

Also the outer layer 15 only immaterially increases the bending stiffness of the connecting area inasmuch as when its reinforcement 17 consists of a fabric, especially knitted fabric, a greater longitudinal elasticity exists.

However, it is advantageous when the outer layer 15 within the region between the bars in the vicinity of the end faces 12 and 13 of the ends 1" and 1' of the supporting strap 1, namely in the region shown in FIG. 4, is reinforced to a greater extent because it is here that due to the absence of a continuous reinforcement 2 of the supporting strap 1 its bending stiffness is only minor. By a stronger reinforcement of the last mentioned region, the bending stiffness can be brought up to the rate of that of the remaining areas of the connection.

FIGS. 3, 3a show how the ends 1' and 1" of the supporting strap 1 can be introduced into the connecting member. To this end, the projections 9'(indicated by dash lines) provided on the inner side 7 of the supporting strap 1 are removed from the ends 1' and 1". These projections 9' are, however, replaced by corresponding projections 19 provided on the connecting member 10 so that, as shown in FIGS. 2 and 4, the counter plates 8 for the connection of the flattened ends 5 of bars 4 are counter sunk within the region of the connecting member and thus do not come into contact with the reversing rollers.

When a supporting strap has broken which occurs mostly at a connecting area of the bars 4, only the rivets 6 of the adjacent three bars of both strap ends 1' and 1" have to be knocked off and the projections 9 have to be cut off within this region. Thereupon the ends 1' and 1" can be inserted into the connecting member which has been preperforated for receiving the connecting screws 20. The ends 1', 1" can then be clamped fast by the screws 20 which simultaneously serve for connecting the bar ends 5. The alignment of the holes in the ends 1' and 1" with the holes in the connecting member 10 can be realized even when the cut of the end faces 12 and 13 of the supporting strap 1 is not precise. This alignment can be realized by the fact that the end faces 11 (FIG. 3) of the connecting member 10 will with a suitably selected length thereof abut the projections 9 which remained.

In order to restore the original length of the supporting strap 1, it is possible, as shown in FIG. 6, to insert a preperforated filling member 21 into the connecting member 10 between the end faces 12 and 13 of the ends 1' and 1" respectively. The filling member 21 is by means of screw 20 connected to the connecting member 10 and to the associated bar end 5. The connecting member must, of course, in such an instance be selected longer by one bar distance. In a corresponding manner also a plurality of bars with filling members and with an extended connecting element can be installed.

It is, of course, to be understood that the present invention is, by no means, limited to the specific showing in the drawings but also comprises any modifications within the scope of the appended claims.

What I claim is:

1. A connection for the ends of the supporting straps of an endless bar belt conveyor, especially for agricultural machines, which includes in combination a connecting member arranged within the region of the two ends of each supporting strap and engaging the inner side of the respective supporting strap, connecting elements connecting said connecting member to the respective adjacent supporting strap, said connecting member comprising a pull-resistant flexible layer having a thickness less than the thickness of said supporting straps, additional connecting elements for connecting the bars of said bar belt conveyor to said supporting straps, the length of the connecting member being so dimensioned that it extends over the range of the connecting areas of at least two bars of both ends of said supporting straps, said connecting member additionally comprising an additional pull-resistant flexible layer engaging the outer side of the supporting straps within the region of both ends of said supporting straps.

2. A connection in combination according to claim 1 in which the longitudinal elasticity of said additional layer is greater than the longitudinal elasticity of said first mentioned layer engaging the inner side of said supporting straps.

3. A connection in combination according to claim 2, which includes means extending around the lateral surfaces of said supporting straps and interconnecting the flexible layers at the outer side and inner side of the respective supporting strap while forming a flat closed hollow profile of rectangular cross section.

4. A connection in combination according to claim 3, which includes projections arranged on the inner side of the respective supporting straps for engagment with reversing rollers associated with said bar belt conveyor, said protrusions being arranged on the inner layer of said connecting member.

5. A connection in combination according to claim 4, in which the two end faces of each supporting strap are spaced from each other by such a distance that the mutual distance of the two bars adjacent said end faces equals the mutual distance of the remaining bars of the conveyor.

6. A connection in combination according to claim 4, in which the two end faces of the ends of the supporting straps are spaced from each other by such a distance that the space therebetween corresponds to a multiple of the mutual distance between the bars forming part of the bar belt conveyor, and which comprises at least one flexible filling piece filling said intermediate space, said at least one filling piece being connected to said connecting member and an associated bar.

* * * * *

UNITED STATES PATENT OFFICE
CERTIFICATE OF CORRECTION

Patent No. 4,023,671   Dated May 17, 1977

Inventor(s) Hans Krämer

It is certified that error appears in the above-identified patent and that said Letters Patent are hereby corrected as shown below:

On the Title page, Item [73] should read:

--- Gummi-Jäger Kommanditgesellschaft of 3 Hannover, Nikolaistrasse 23-25, Federal Republic of Germany. ---.

Signed and Sealed this

Twenty-second Day of November 1977

[SEAL]

Attest:

RUTH C. MASON
*Attesting Officer*

LUTRELLE F. PARKER
*Acting Commissioner of Patents and Trademarks*